(12) United States Patent
Lauterbach et al.

(10) Patent No.: US 9,205,410 B2
(45) Date of Patent: Dec. 8, 2015

(54) ONE-STEP SYNTHESIS OF MONODISPERSE TRANSITION METAL CORE-SHELL NANOPARTICLES WITH SOLID SOLUTION SHELLS

(71) Applicants: Jochen A. Lauterbach, Columbia, SC (US); Jason R. Hattrick-Simpers, Irmo, SC (US); Cun Wen, Columbia, SC (US)

(72) Inventors: Jochen A. Lauterbach, Columbia, SC (US); Jason R. Hattrick-Simpers, Irmo, SC (US); Cun Wen, Columbia, SC (US)

(73) Assignee: University of South Carolina, Columbia, SC (US)

( * ) Notice: Subject to any disclaimer, the term of this patent is extended or adjusted under 35 U.S.C. 154(b) by 329 days.

(21) Appl. No.: 13/855,349

(22) Filed: Apr. 2, 2013

(65) Prior Publication Data
US 2013/0288892 A1 Oct. 31, 2013

Related U.S. Application Data

(63) Continuation of application No. 61/686,288, filed on Apr. 3, 2012.

(51) Int. Cl.
  *B22F 9/26* (2006.01)
  *B82Y 40/00* (2011.01)
  *B01J 23/86* (2006.01)
  *B01J 23/75* (2006.01)
  *B01J 37/08* (2006.01)
  *B01J 23/755* (2006.01)
  *B01J 35/00* (2006.01)
  *B01J 13/02* (2006.01)

(52) U.S. Cl.
  CPC ............ *B01J 23/864* (2013.01); *B01J 13/02* (2013.01); *B01J 23/75* (2013.01); *B01J 23/755* (2013.01); *B01J 35/002* (2013.01); *B01J 35/006* (2013.01); *B01J 35/008* (2013.01); *B01J 37/08* (2013.01); *B22F 9/26* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 7,053,021 B1 * | 5/2006 | Zhong et al. | ................... | 502/185 |
| 2013/0260282 A1 * | 10/2013 | Yan et al. | ...................... | 429/487 |

OTHER PUBLICATIONS

Bell, "The Impact of Nanoscience on Heterogeneous Catalysis". Science 2003, 299, 1688-1691.
Whitney et al., "Fabrication and Magnetic Properties of Arrays of Metallic Nanowires". Science 1993, 261, 1316-1319.
Mühlschlegel et al., "Resonant Optical Antennas". Science 2005, 308, 1607-1609.
Cho, "Connecting the Dots to Custom Catalysts". Science 2003, 299, 1684-1685.
Somorjai et al., "Clusters, surfaces, and catalysis." Proceedings of the National Academy of Sciences 2006, 103, 10577-10583.

(Continued)

*Primary Examiner* — George Wyszomierski
(74) *Attorney, Agent, or Firm* — Dority & Manning, P.A.

(57) ABSTRACT

Methods of forming monodispersed core-shell nanoparticles are provided. A cobalt(II)-ligand component, a metal(II)-ligand component, an organic reducing agent, and a capping agent can be added to an organic solvent to form a reaction mixture. The reaction mixture is then heated to a dissolving temperature while under a gas (e.g., including methane) such that the reaction mixture becomes a reaction solution while stirring at the dissolving temperature. The reaction solution is then be heated to a reaction temperature (e.g., about 200° C. or more) while under the gas to form the core-shell nanoparticles, and the core-shell nanoparticles can be collected from the reaction solution.

18 Claims, 17 Drawing Sheets

(56) References Cited

OTHER PUBLICATIONS

Chen et al., "The Structure of Catalytically Active Gold on Titania". Science 2004, 306, 252-255.

Valden et al., "Onset of Catalytic Activity of Gold Clusters on Titania with the Appearance of Nonmetallic Properties". Science 1998, 281, 1647-1650.

Tian et al., "Synthesis of Tetrahexahedral Platinum Nanocrystals with High-Index Facets and High Electro-Oxidation Activity". Science 2007, 316, 732-735.

Xie et al., "Low-temperature oxidation of CO catalysed by $Co_3O_4$ Nanorods". Nature 2009, 458, 746-749.

Rodriguez et al., "Activity of CeOx and TiOx Nanoparticles Grown on Au(111) in the Water-Gas Shift Reaction". Science 2007, 318, 1757-1760.

Tao et al., "Reaction-Driven Restructuring of Rh—Pd and Pt—Pd Core-Shell Nanoparticles". Science 2008, 322, 932-934.

Edwards et al., "Switching Off Hydrogen Peroxide Hydrogenation in the Direct Synthesis Process". Science 2009, 323, 1037-1041.

Enache et al., "Solvent-Free Oxidation of Primary Alcohols to Aldehydes Using Au—Pd/TiO2 Catalysts". Science 2006, 311, 362-365.

Lim et al., "Pd—Pt Bimetallic Nanodendrites with High Activity for Oxygen Reduction". Science 2009, 324, 1302-1305.

Alayoglu et al., "Ru—Pt core-shell nanoparticles for preferential oxidation of carbon monoxide in hydrogen". Nature Material 2008, 7, 333-338.

Toshima et al., "Bimetallic nanoparticles—novel materials for chemical and physical applications". New J Chem 1998, 22, 1179-1201.

Tao et al., "Shape Control of Colloidal Metal Nanocrystals". Small 2008, 4, 310-325.

Lee et al., "Redox-Transmetalation Process as a Generalized Synthetic Strategy for Core-Shell Magnetic Nanoparticles". J Am Chem Soc 2005, 127, 16090-16097.

Chen et al., "$Fe_3O_4$/$TiO_2$ Core/Shell Nanoparticles as Affinity Probes for the Analysis of Phosphopeptides Using $TiO_2$ Surface-Assisted Laser Desorption/Ionization Mass Spectrometry". Analytical Chemistry 2005, 77, 5912-5919.

Jiang et al., "A one-pot protocol for synthesis of non-noble metal-based core-shell nanoparticles under ambient conditions: toward highly active and cost-effective catalysts for hydrolytic dehydrogenation of $NH_3BH_3$." Chem Commun 2011, 47, 10999-11001.

Nørskov et al., "Density functional theory in surface chemistry and catalysis". Proceedings of the National Academy of Sciences 2011, 108, 937-943.

Mouaddib et al., "Characterization of copper—cobalt catalysts for alcohol synthesis from syngas". Applied Catalysis A: General 1994, 118, 63-72.

Zhou et al., "Pt—Cu Core-Shell and Alloy Nanoparticles for Heterogeneous $NO_x$ Reduction: Anomalous Stability and Reactivity of a Core-Shell Nanostructure". Angewandte Chemie International Edition 2005, 44, 4539-4543.

Cliff et al., "The Quantitative Analysis of Thin Specimens". Journal of Microscopy 1975, 103, 203-207.

Powell et al., "NIST Electron Inelastic-Mean-Free-Path Database". National Institute of Standards and Technology, Gaithersburg, MD, 2010.

Hu et al., "Controllable Synthesis and Enhanced Electrochemical Properties of Multifunctional $Au_{core}Co_3O_{4shell}$ Nanocubes". The Journal of Physical Chemistry B 2006, 110, 24305-24310.

Fierro et al., "TPR and XPS study of cobalt—copper mixed oxide catalysts: evidence of a strong Co—Cu interaction". Top Catal 2000, 10, 39-48.

Reddy et al., "Copper Promoted Cobalt and Nickel Catalysts Supported on Ceria-Alumina Mixed Oxide: Structural Characterization and CO Oxidation Activity". Ind Eng Chem Res 2009, 48, 8478-8486.

Huffman et al., "In Situ XAFS Investigation of K-Promoted Co Catalysts". J Catal 1995, 151, 17-25.

\* cited by examiner

ONE-STEP SYNTHESIS OF MONODISPERSE TRANSITION METAL CORE-SHELL NANOPARTICLES WITH SOLID SOLUTION SHELLS

PRIORITY INFORMATION

The present application claims priority to U.S. Provisional Patent Application Ser. No. 61/686,288 titled "One-Step Synthesis of Monodisperse Transitional Metal Core-Shell Nanoparticles with Solid Solution Shells" of Lauterbach, et al. filed on Apr. 3, 2012, the disclosure of which is incorporated by reference herein.

BACKGROUND

Nanoparticles have attracted a great deal of attention in fields such as catalysis, magnetics, and optics, due to their extraordinary properties. In particular, the exploration of new frontiers in catalysis has been intimately related to developments of well-defined nanomaterials. Over the past 20 years, an explosion of interest in nanomaterials has greatly promoted fundamental understanding of catalysis. Effects of particle size, crystal plane orientations, and surface defects on catalytic performances have all been investigated on single component catalysts, partially enabled by the realization of nanomaterials with well-defined morphologies.

Recently, interest has shifted toward bimetallic catalyst systems, due to their potential to enhance catalytic activity or even create bi-functional surfaces capable of propagating technically challenging chemical reactions. For bimetallic catalysts, outstanding catalytic performance has been reported for various reactions, including alcohol oxidation and oxygen reduction. These successes have triggered intense interest in the preparation of bimetallic catalysts with controlled morphologies and sizes. Among the as-obtained bimetallic nanoparticles, those with core-shell structures are especially interesting. The core-shell nanoparticles have shown superior catalytic activity and/or selectivity in many reactions, which could be partially attributed to high index facets on the surface. Another benefit of the core-shell architecture is a reduced catalyst cost by minimizing the usage of the expensive active component.

Transition metals are often categorized as being noble and non-noble, in general the morphology and size control of noble-metal nanoparticles are relatively well understood. Despite the diverse spectrum of synthesized noble-metal nanoparticles, synthesis procedures are often similar, with most incorporating the use of capping agents, for instance poly (vinyl pyrrolidone) PVP. Mechanistically it is understood that the capping agents control the morphology and size of the nanoparticles by binding with the noble metals through carbonyl or amino groups.

In contrast to the case for noble-metal nanoparticles, non-noble metal nanoparticles are notorious for the difficulties associated with controlling the morphology and size. The binding energies of the capping agents on transition metal surfaces are different (lower in most cases) from that on noble metal surfaces. The disparity can be related to differences in the d-band structure, since the d-orbitals of non-noble metals are filled with fewer electrons than that of noble metals. Filled d-orbital are required to interact with the electrophilic group, carbonyl in PVP, and the electron deficient d-orbitals of non-noble metals thus has lower adsorption energy to PVP. In the literature, to maintain tight control of the morphology and size, two steps are needed to prepare core-shell structures, first forming the core of the nanoparticles and then coating the core with the other component as the shell.

Though two step can synthesis procedures produce core-shell particles with narrow size distribution, it results in a mono-metallic surface rather than presenting a solid solution of two metals on the surface. The mono-metallic shell is good for reactions with single-active-site mechanism, but not for those with double-active-site mechanisms. Furthermore, the two-step synthesis is prohibiting large scale production due to the complicated procedure, and delicate centrifuging/re-dispersion.

SUMMARY

Objects and advantages of the invention will be set forth in part in the following description, or may be obvious from the description, or may be learned through practice of the invention.

Methods are generally provided for forming monodispersed core-shell nanoparticles. In one embodiment, a cobalt (II)-ligand component, a metal(II)-ligand component, an organic reducing agent, and a capping agent are added to an organic solvent to form a reaction mixture. The reaction mixture is then heated to a dissolving temperature while under a gas (e.g., including methane) such that the reaction mixture becomes a reaction solution while stirring at the dissolving temperature. The reaction solution can then be heated to a reaction temperature (e.g., about 200° C. or more) while under the gas to form the core-shell nanoparticles, and the core-shell nanoparticles can be collected from the reaction solution.

According to one particular embodiment, the metal(II)-ligand comprises a metal(II) selected from the group consisting of copper(II), iron(II), chromium(II), scandium(II), nickel (II), zirconium (IV), and mixtures thereof.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 10a shows a STEM image of the CoFe nanoparticles shown in FIG. 9a; and

FIG. 10b shows a EDX line scan of the CoFe nanoparticles shown in FIG. 9a.

DETAILED DESCRIPTION

Figure 1A:
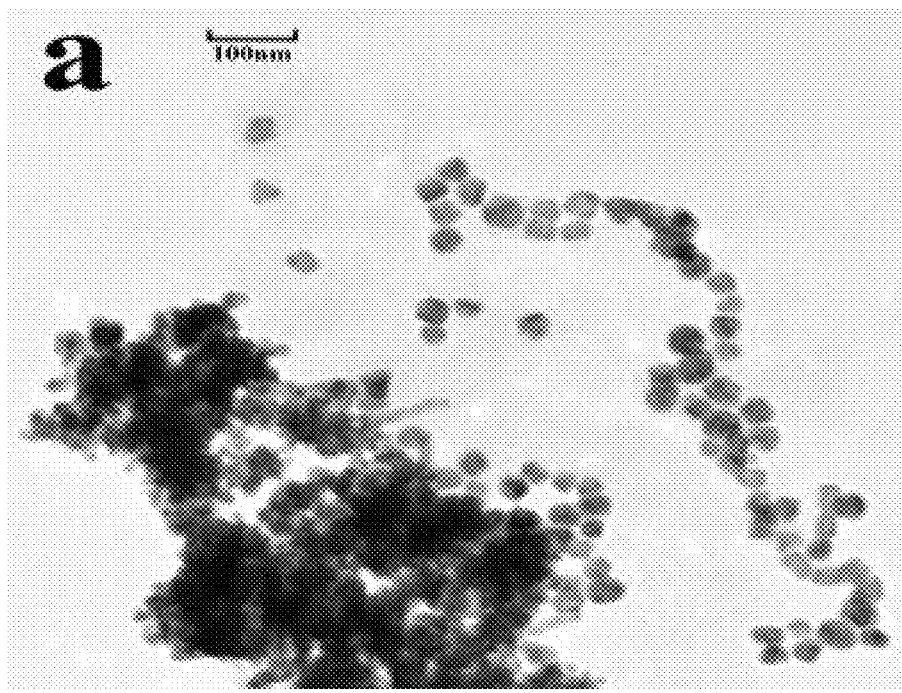
FIG. 1a shows a TEM image of CoCu (9:1 atomic ratio of Co to Cu) nanoparticles synthesized with a PVP concentration of 0.05 mol $L^{-1}$.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A method is generally provided for a scalable, single pot, one-step synthesis process of monodispersed CoCu core-shell nanoparticles with Co—Cu solid solutions present in the shell. According to this single pot method, CoCu solid solution nanoparticles can be synthesized with narrow size-distribution utilizing PVP as a capping agent. The as-formed nanoparticles are present in a well-defined core-shell structure, with solid solution structures of Co and Cu present in both the core and shell. The concentration of PVP plays an important role in controlling the morphology and size distribution of the CoCu nanoparticles.

The synthesis strategy can be extended from copper (i.e., CoCu) to other transition metals to be paired with cobalt, such as Fe, Cr, Sc, Ni, Zr, or mixtures thereof. Thus, with this synthesis strategy, mono-dispersed transition bimetallic nanoparticles could be obtained, which has the full potential for scale up production.

In one embodiment of the method of forming monodispersed core-shell nanoparticles, a cobalt(II)-ligand component (e.g., cobalt(II)-acetylacetonate); a metal(II)-ligand component, an organic reducing agent, and a capping agent are added to an organic solvent to form a reaction mixture. The metal(II)-ligand can comprises any suitable metal(II), including but not limited to copper(II), iron(II), chromium (II), scandium(II), Nickel (II), Zr (IV), or mixtures thereof. In one particular embodiment, the metal(II)ligand is a metal(II)-acetylacetonate (e.g., copper(II)-acetylacetonate).

The cobalt(II)-ligand component and the metal(II)-ligand component can be present in the reaction mixture such that an atomic ratio of cobalt(II) to metal(II) is about 19:1 to about 1:19, such as about 19:1 to about 4:1.

Then, the reaction mixture is heated to a dissolving temperature (e.g., about 50° C. to about 150° C.) such that the reaction mixture becomes a reaction solution while stirring at the dissolving temperature. This heating can be performed while under a gas that includes methane (e.g., natural gas).

The reaction solution is then heated to a reaction temperature while under the gas to form the core-shell nanoparticles. In one embodiment, the reaction temperature is about 200° C. or more (e.g., about 200° C. to about 250° C.). The reaction solution is performed while under the gas containing methane during formation of the nanoparticles. Without wishing to be bound by any particular theory, it is believed that the inclusion of methane within the system during the reaction inhibits and/or prevents the metals from oxidizing during formation of the nanoparticles and/or the nanoparticles from oxidizing after formation. In fact, it was surprisingly shown that the use of certain inert gases (e.g., hydrogen gas or nitrogen gas) resulted in significantly different results with otherwise identical reaction components and processes.

During the reaction, the organic reducing agent serves as a reducing agent to reduce both the cobalt(II) and the metal(II) in the reaction system, but is not overly aggressive so as to prevent aggregation of nanoparticles due to rapid particle growth. In one embodiment, the organic reducing agent is a long chain alcohol, such as 1,2-dodecanediol, 1,2-tetradecanediol, or the like.

After formation of the nanoparticles, the capping agent in the reaction solution will be adsorbed on the surface of the nanoparticles, and prevent further nanoparticle growth. In one particular embodiment, the capping agent includes a polymer having a repeating, exposed carbonyl group that can interact with the metallic nanoparticles by electron donation from the metal to the C=O bond, such as poly(vinyl pyrrolidone), L-alanine, oleic acid, or mixtures thereof.

The concentration of the capping agent in the reaction solution can be controlled so as to control the resulting average particle size.

The core-shell nanoparticles formed can then be collected from the reaction solution, and dispersed in a solvent (e.g., acetone). In particular embodiments, the collected core-shell nanoparticles have an average size of about 7 nm to about 50 nm. The nanoparticles can also have a relatively narrow size distribution. For example, the collected core-shell nanoparticles have a size distribution such that at least about 75% of the collected core-shell nanoparticles have an average size that is within about 5 nm of the mean average size of all the collected core-shell nanoparticles.

In one embodiment, the resulting core-shell nanoparticles have a core enriched with the metal (e.g., copper), while its shell is enriched with cobalt. For example, when formed from a combination of a cobalt(II)-ligand component (e.g., cobalt (II)-acetylacetonate) and a copper(II)-ligand component (e.g., copper(II)-acetylacetonate), the resulting core-shell nanoparticles has a core enriched with copper, while its shell is enriched with cobalt. Without wishing to be bound by any particular theory, it is believed that the copper reduces faster than cobalt within the reaction solution (i.e., copper(II) reduces to copper(I)), and thus begins to agglomerate as a copper-enriched core. Then, upon sufficient reduction of the cobalt component (i.e., cobalt(II) reduces to cobalt(I)) after the reaction process proceeds, cobalt begins to agglomerate about the already formed core to create a cobalt-enriched shell.

The organic solvent, in one particular embodiment, has a boiling point that is higher than the reaction temperature such that the solvent does not boil and/or significantly evaporate during the reaction. Particularly suitable organic solvents include, but are not limited to, dibenzyl ether, diphenel ether, N,N-dimethylformamide, or mixtures thereof.

EXAMPLES

Described herein is a novel one-step synthesis technique to form CoCu core-shell nanoparticles with narrow size-distributions. We demonstrate through extensive structural characterizations that the shell obtained is composed of a solid solution of Cu in Co.

Typically, 0.25 g Cobalt(II) acetylacetonate ($Co(AcAc)_2$) and 0.0282 g Copper(II) acetylacetonate ($Cu(AcAc)_2$) was added to a 100 mL Dibenzyl ether, which lead to the CoCu nanoparticle with atomic ratio of Cu to Co of 1:9. Then, 0.333 g 1,2-dodecanediol and 6.1 g poly (vinyl pyrrolidone) was added. The solution was stirred under methane (industrial purity) protection at 100° C. for 3 h. After 3 h, the solution transformed from a suspension into a homogenous black brown solution. Afterward, the temperature was further increased to 220° C. and kept for 1.5 h still under the protection of natural gas. The color became totally black, and the nanoparticles were collected from the stir bar and dispersed in acetone. For different atomic ratio of Cu to Co or different second metal other than Cu, the type and amount of precursors were changed accordingly.

Figure 1B:
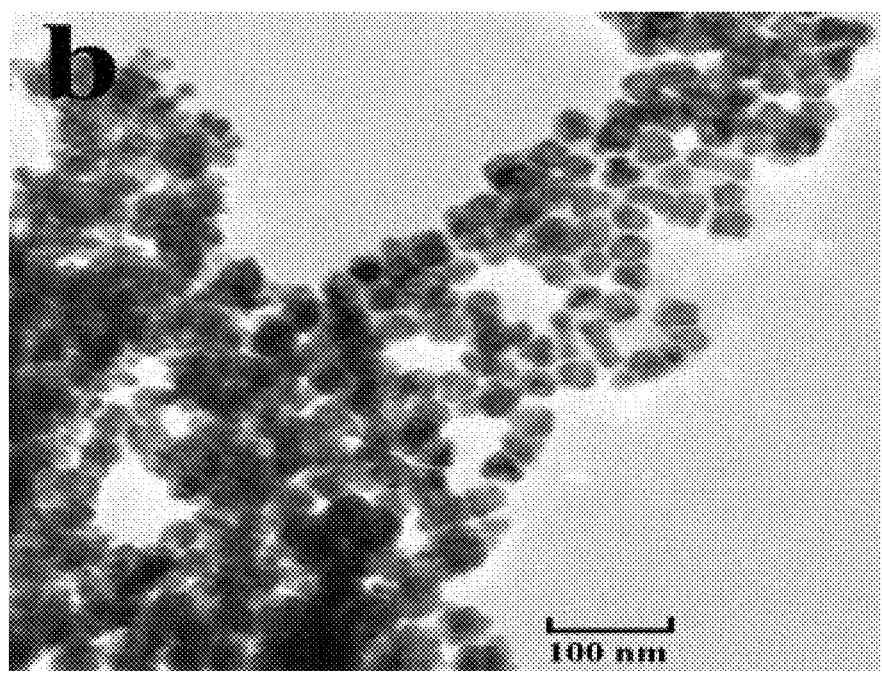
FIG. 1b shows a TEM image of CoCu (9:1 atomic ratio of Co to Cu) nanoparticles synthesized with a PVP concentration of 0.1 mol $L^{-1}$.
Figure 1C:
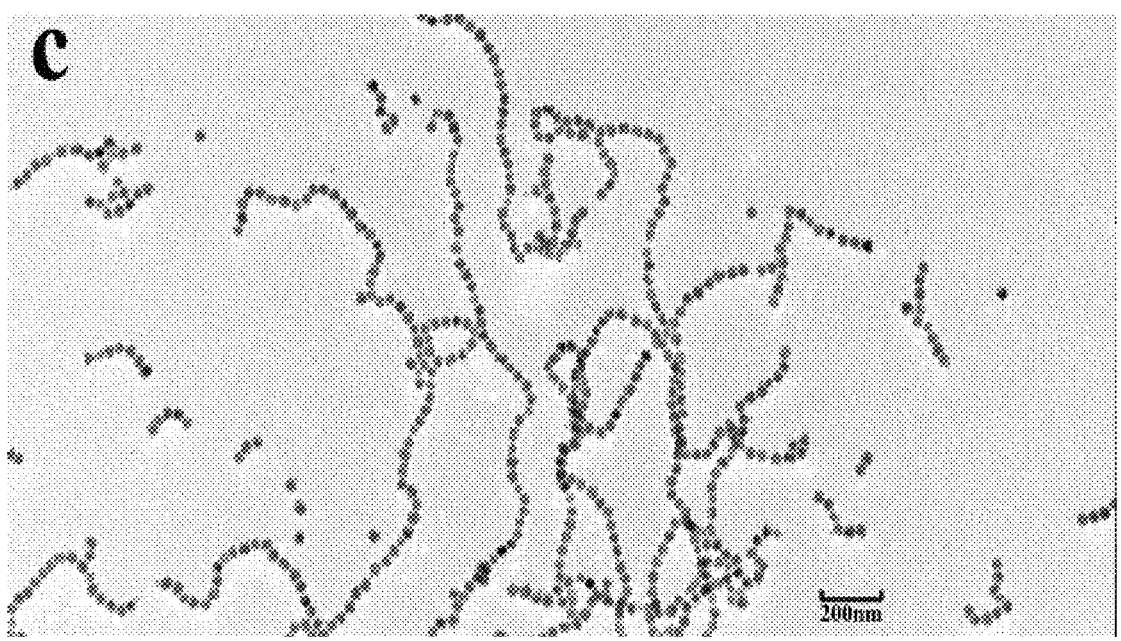
FIG. 1c shows a TEM image of CoCu (9:1 atomic ratio of Co to Cu) nanoparticles synthesized with a PVP concentration of 0.55 mol $L^{-1}$.
Figure 1D:
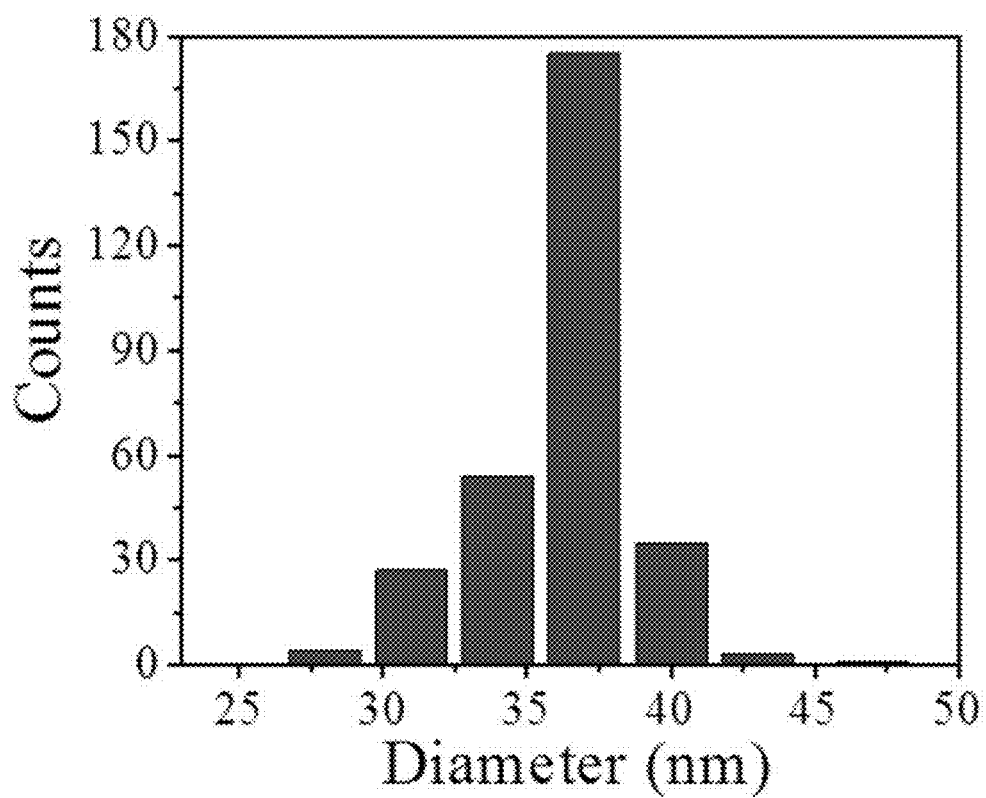
FIG. 1d shows a histogram of the size distribution and more than 300 nanoparticles are counted.
Figure 4A:
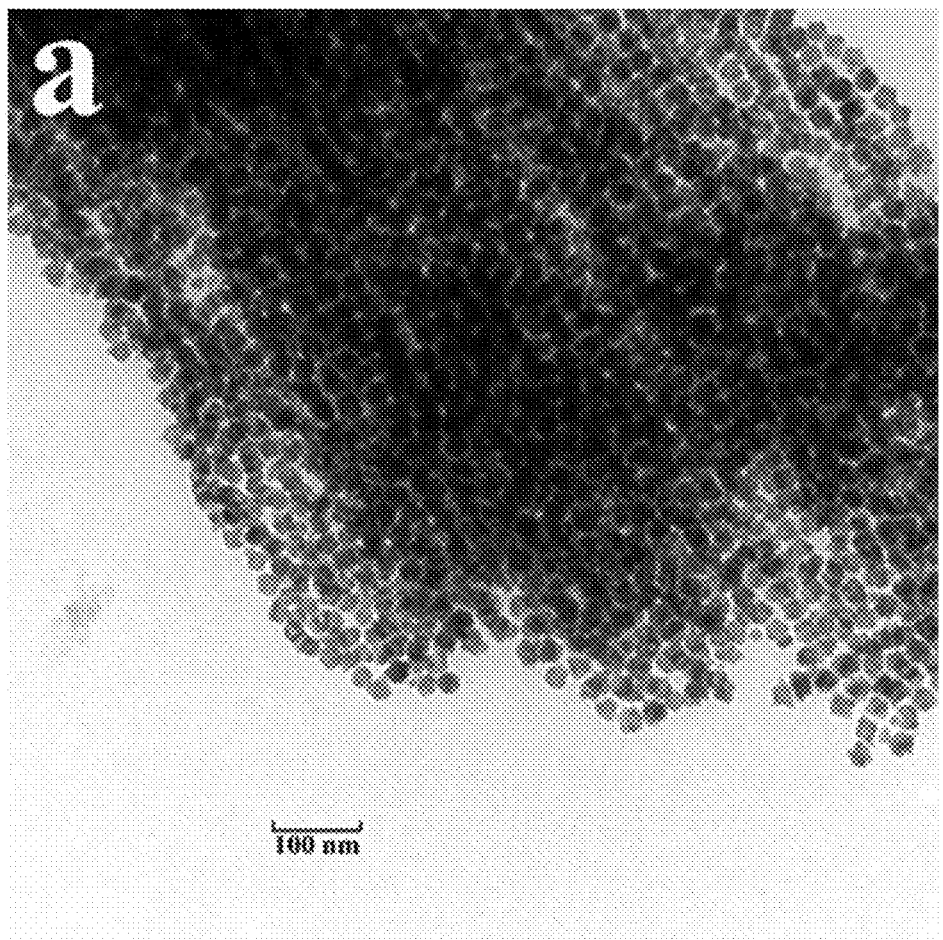
FIG. 4a shows a TEM image of CoCu (19:1 atomic ratio of Co to Cu) nanoparticles synthesized with PVP concentration of 0.55 mol $L^{-1}$.
Figure 4B:
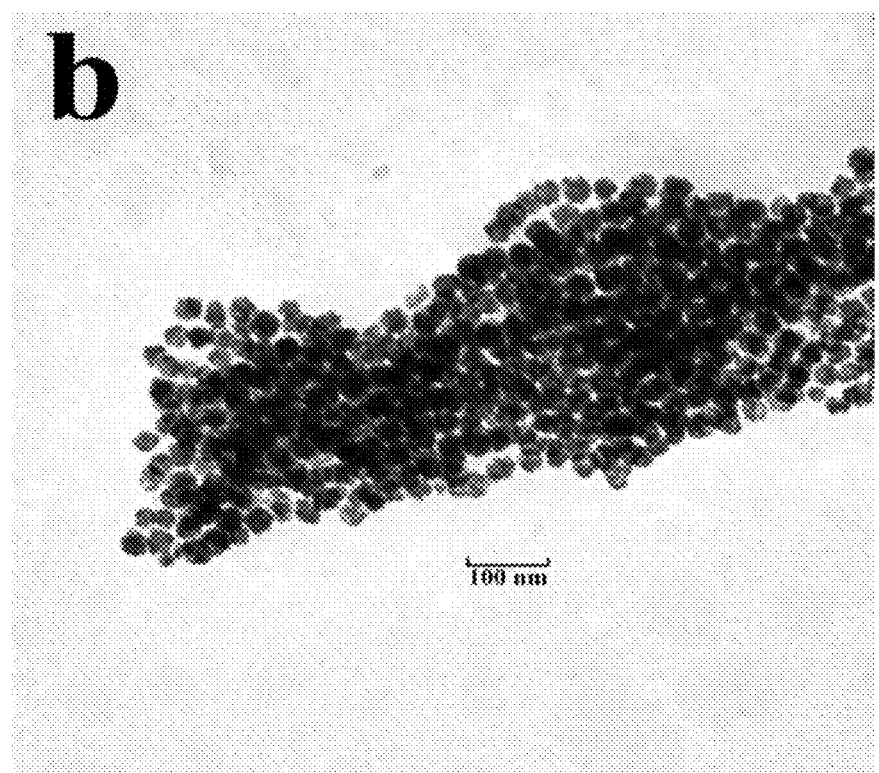
FIG. 4b shows a TEM image of CoCu (4:1 atomic ratio of Co to Cu) nanoparticles synthesized with PVP concentration of 0.55 mol $L^{-1}$.
Figure 5:
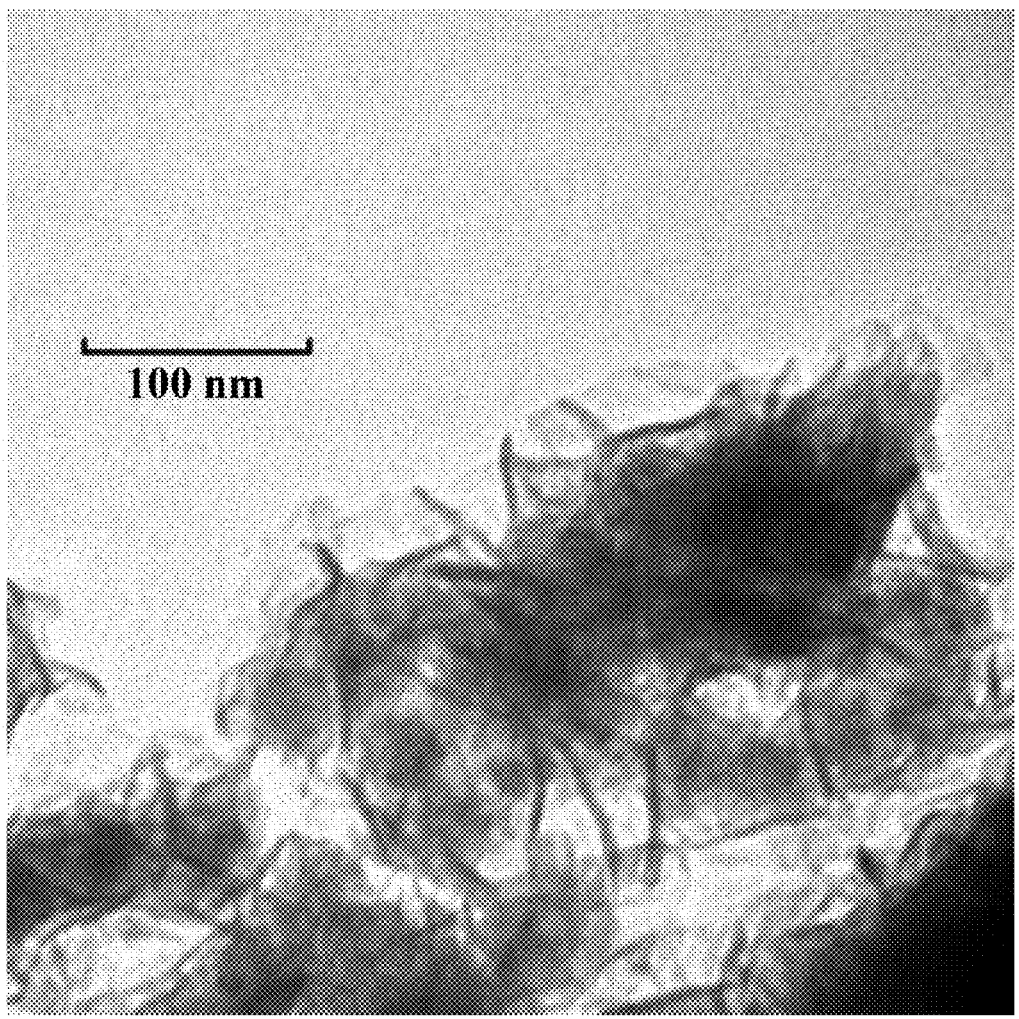
FIG. 5 shows a TEM image of CoCu (9:1 atomic ratio of Co to Cu) nanosheets synthesize with PVP concentration of 0.8 mol $L^{-1}$.
Figure 6:
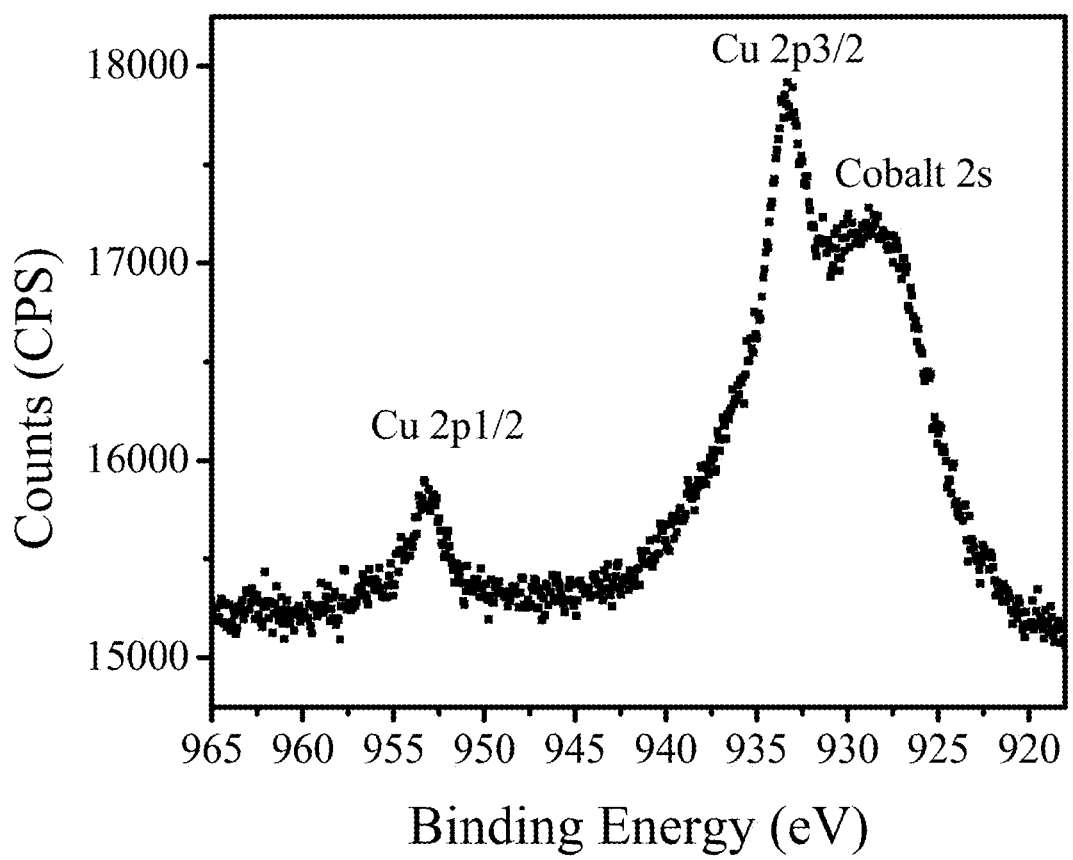
FIG. 6 shows an XPS profile of the Cu 2p in CoCu (9:1 atomic ratio of Co to Cu)

CoCu nanoparticles were synthesized with PVP as the capping agent. As shown in FIG. 1a-c, the morphology of CoCu (with a Cu to Co atomic ratio of 1 to 9) varied by changing concentration of PVP in the region from 0.05 to 0.55 mol L. The lowest concentration of PVP used for the CoCu nanoparticles synthesis is 0.05 mol $L^{-1}$, which is ten times the concentration usually used for the noble metal nanoparticles preparation. Even at this PVP concentration, considerable CoCu forms irregular agglomerates rather than nanoparticles, as shown in FIG. 1a. This could be attributed to the insufficient binding energy of PVP with the metal surface. By increasing the PVP concentration from 0.1 to 0.55 mol $L^{-1}$, improvements to the morphology and size distribution are achieved, see FIG. 1c. Here, no irregular agglomerates could be observed with TEM. Furthermore, the size is well controlled with an average particle size 35.0 nm±2.8 nm. This method works for a wide range of Co/Cu ratios (up to 4:1), and yields CoCu nanoparticles with narrow size distributions (shown in FIG. 4). However, further increase of the PVP concentration (0.8 mol $L^{-1}$) results in the formation of nanosheets, as shown in FIG. 5. These results indicate that the PVP concentration plays an important role in the morphology and size control for CoCu nanoparticle synthesis.

Figure 2A:
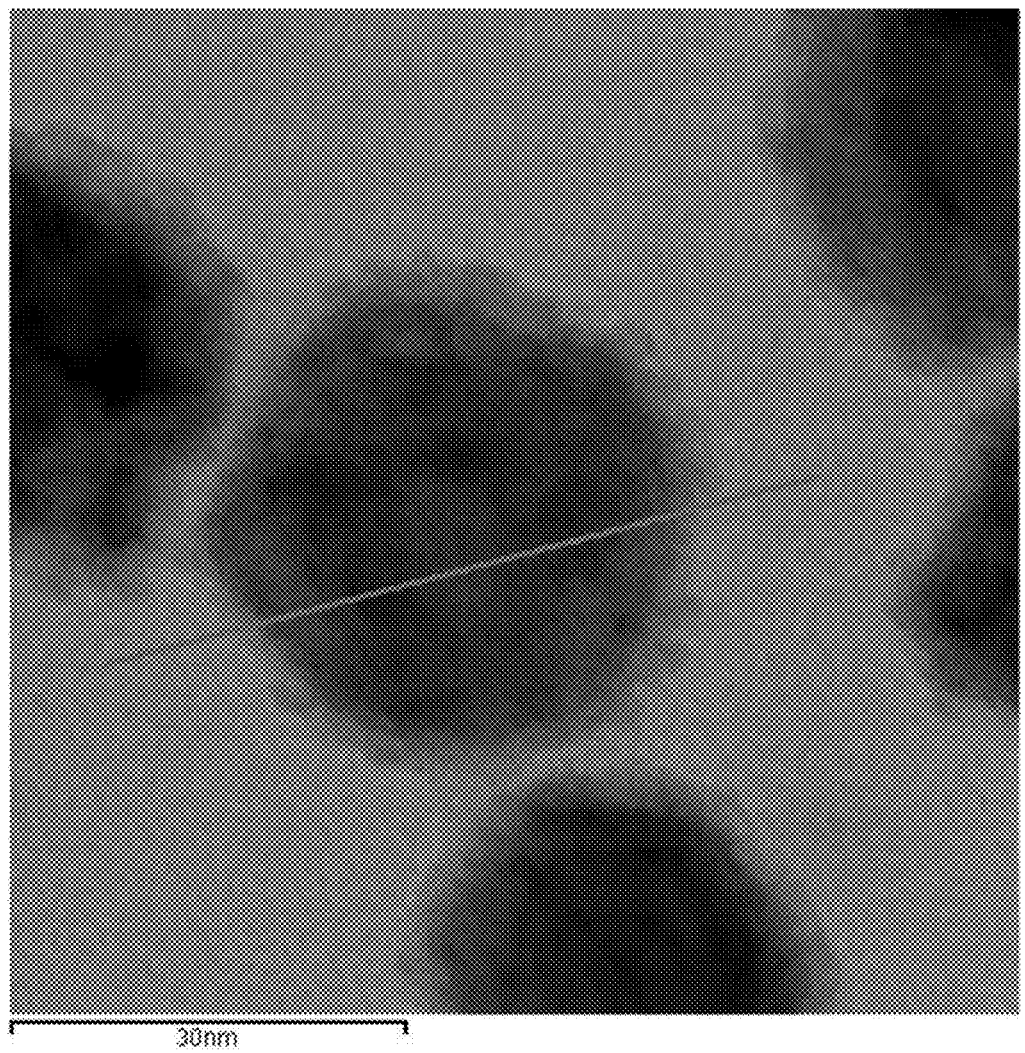
FIG. 2a shows an HRTEM image the EDX line scan of the CoCu (9:1 atomic ratio of Co to Cu) nanoparticles
Figure 2B:
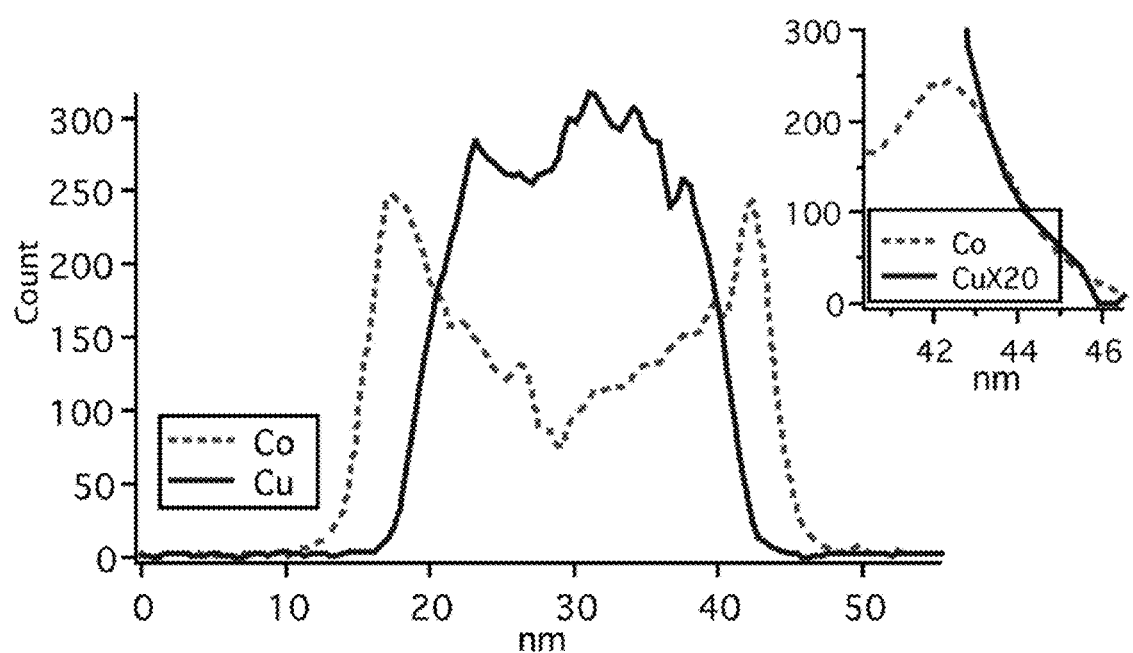
FIG. 2b shows the zoom in of EDX line scan at the shell of nanoparticles.

The detailed structure of the CoCu nanoparticles was determined using HRTEM and energy-dispersive X-ray spectroscopy (EDX). From the image (FIG. 2), the CoCu nanoparticles have a core-shell structure with uniform size distribution. The mean diameter of the core and thickness of the shell is 25 nm and 5 nm, respectively, which makes the overall core-shell nanoparticle size consistent with the results (35 nm±2.8 nm) obtained on low magnification TEM. The EDX line scans show that the CoCu nanoparticles form core-shell structures, which is consistent with the high resolution TEM image, and a representative scan is shown in the FIG. 2b. In the EDX line scan, the red line represent the signal of Co, and blue one for Cu. A radially varying distribution of Co and Cu is observed, with a Cu enriched core surrounded by a Co-enriched shell. The composition of the nanoparticle shell was estimated to be $Co_{95}Cu_5$ using the Cliff Lorimer method. The use of the Cliff-Lorimer approximation is well justified for measurements of the nanoparticle shells where the specimen is thin enough to avoid absorbance/fluorescence effects, this is less safe when estimating the composition of the core. The overall nanoparticle composition of the as-formed nanoparticles, as measured by atomic absorbance measurements, is consistent both with the atomic ratios during synthesis. Furthermore, the EDX line scan provides evidence for the presence of an alloyed shell and core, as both Co and Cu are detected throughout the nanoparticle which is marked out with vertical lines in FIG. 2. Thus, both the TEM image and the EDX lines scans indicate that a core-shell structure is formed, while EDX line scans suggest that a solid solution of Co and Cu is present in both core and shell.

Figure 3A:
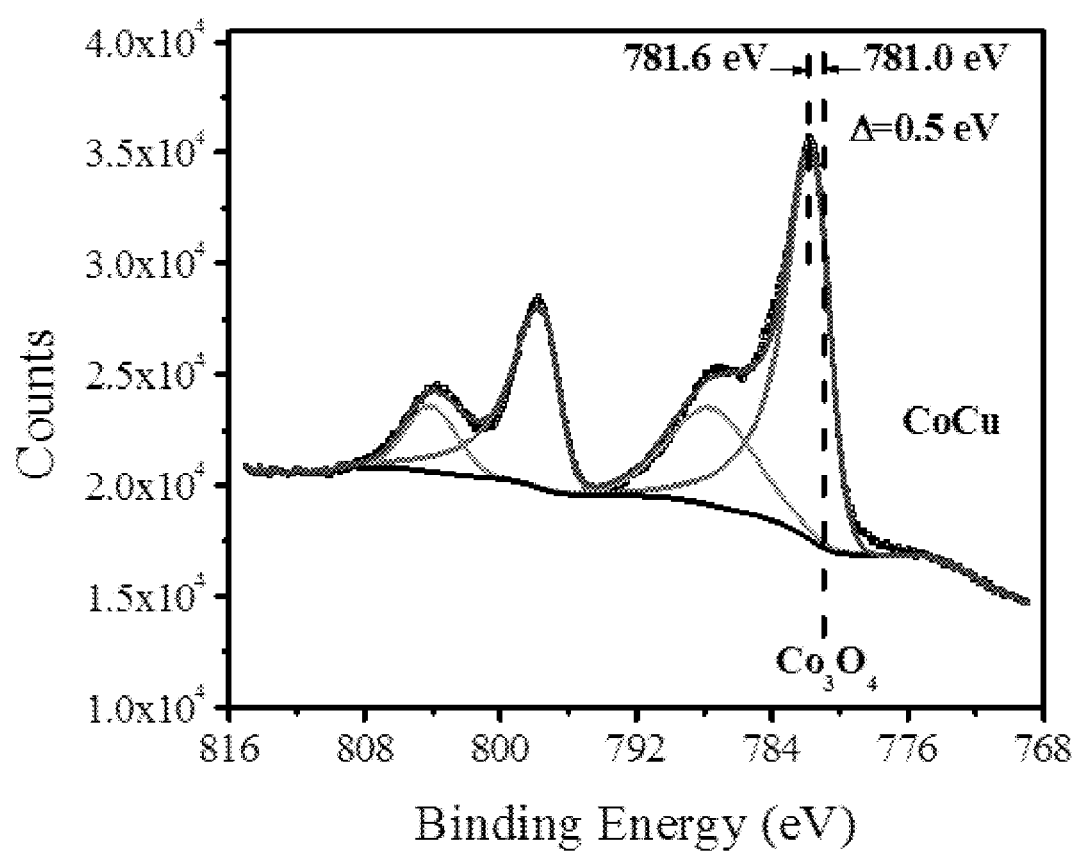
FIG. 3a shows the XPS spectra of the CoCu nanoparticles (9:1 atomic ratio of Co to Cu) for the Co, compared with the XPS spectra $Co_3O_4$ from literature (J. Hu, Z. Wen, Q. Wang, X. Yao, Q. Zhang, J. Zhou, J. Li, The Journal of Physical Chemistry B 2006, 110, 24305-24310)

The presence of Co—Cu solid solution in the shell was strongly supported by X-ray photoelectron spectroscopy (XPS), which is a surface sensitive technique. From the XPS spectra, shown in FIG. 3a (Co) and FIG. S3 (Cu), both Co and Cu signals are observed. As the mean free paths of Co and Cu photoelectrons are smaller than 2.2 nm and the shell thickness is around 5 nm, the presence of both Co and Cu in the XPS data indicate that both elements are present in the shell, consistent with the EDX results. Furthermore, from the XPS profile of Co, the binding energy of Co 2p 3/2 in the nanoparticle is 781.6±0.3 eV, which is 0.6 eV higher than that of pure $Co_3O_4$ core-shell nanoparticles (781.0 eV). This shift in the binding energy may be attributed to the replacement of Co with Cu in a spinel Co-oxide. Cu has a higher electronegativity than Co, which results in lower virtual valence compared with pure Co, though the nominal valences of both Cu and Co are +2. To compensate the lower virtual valence of Cu and keep the CoCu electronically neutral, the virtual valence of Co neighboring to Cu would be shifted up, and increase the binding energy of the Co. The binding energy of Co in CoCu core-shell nanoparticles reported here agrees, within experimental error, with values reported in the literature for CoCu nanoparticles (Co 2p 3/2=781.3 eV). Thus, the experimental results indicate that Co and Cu are both intimately physically mixed and are chemically interacting with one another, which strongly suggest the formation of a CoCu solid solution in the shell.

Figure 3B:
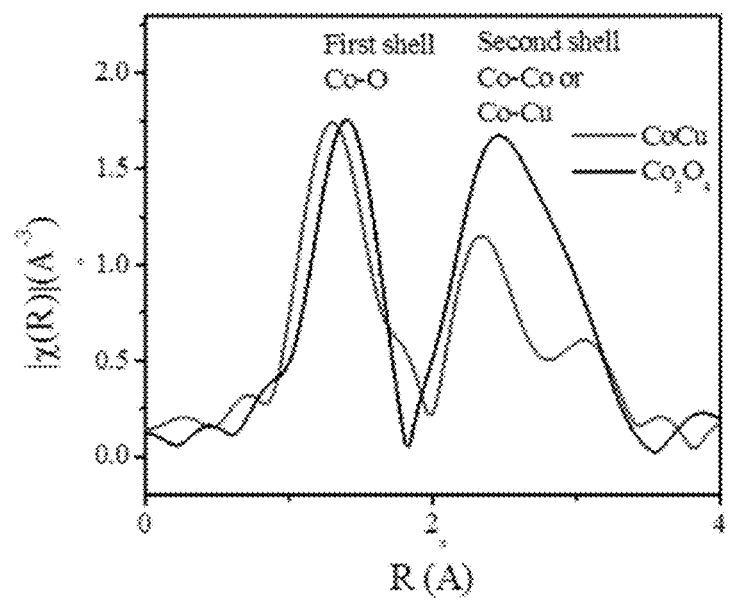
FIG. 3b shows the Radical Structure Function of EXAFS profile on the CoCu nanoparticles of FIG. 3a, compared with that on pure $Co_3O_4$ standards.
Figure 3C:
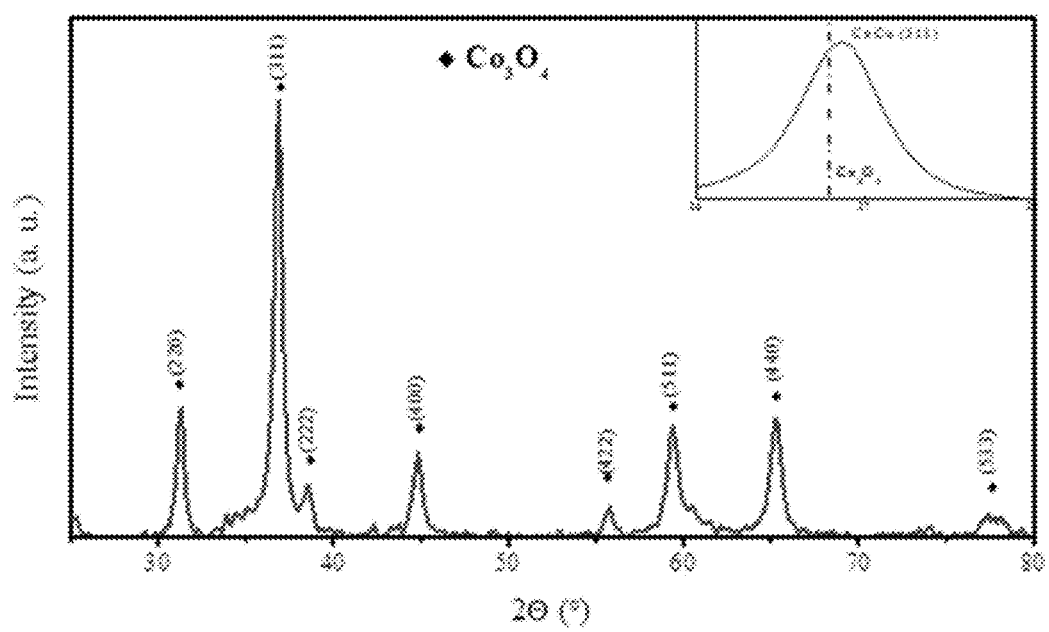
FIG. 3c shows the XRD pattern of the CoCu nanoparticles of FIG. 3a, with the insert being the zoom in at 2θ between 36° and 38° and the dash-dot line represent the peak position for pure $Co_3O_4$.
Figure 7:
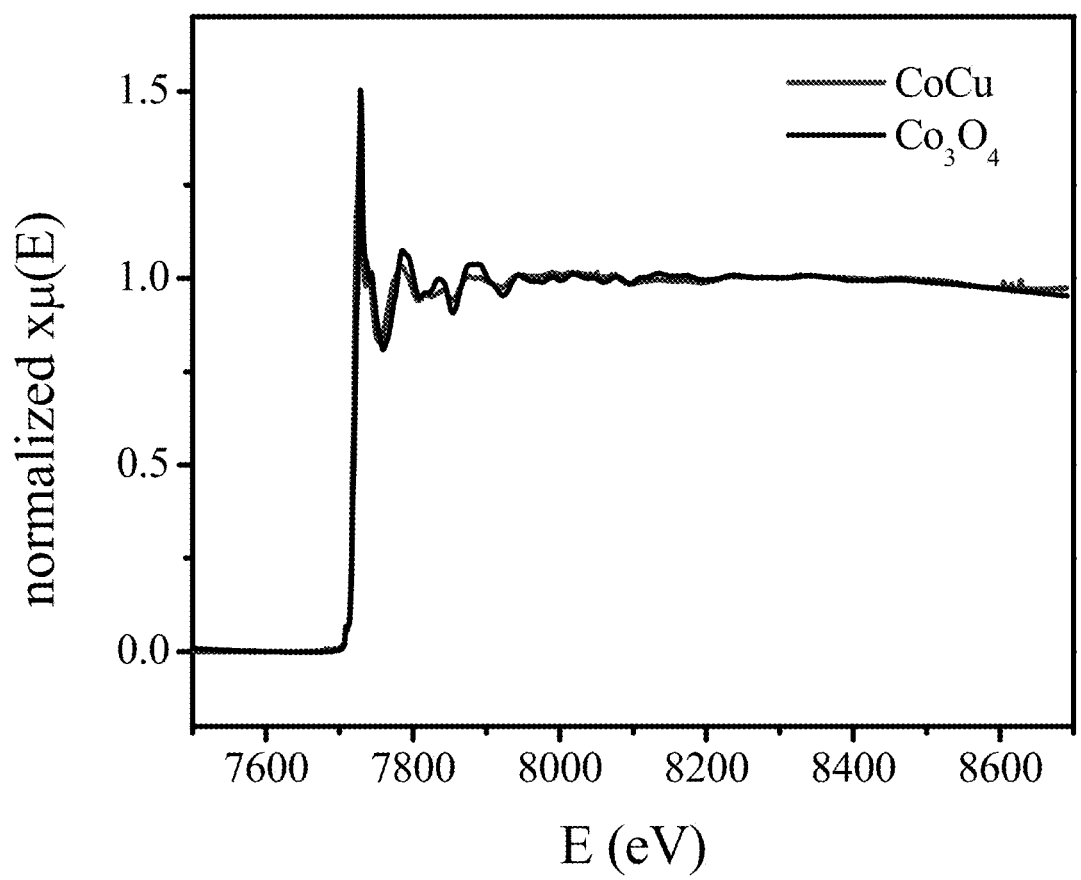
FIG. 7 shows a XANE profiles of CoCu (9:1 atomic ratio of Co to Cu) compared to pure $Co_3O_4$ standards.
Figure 8:
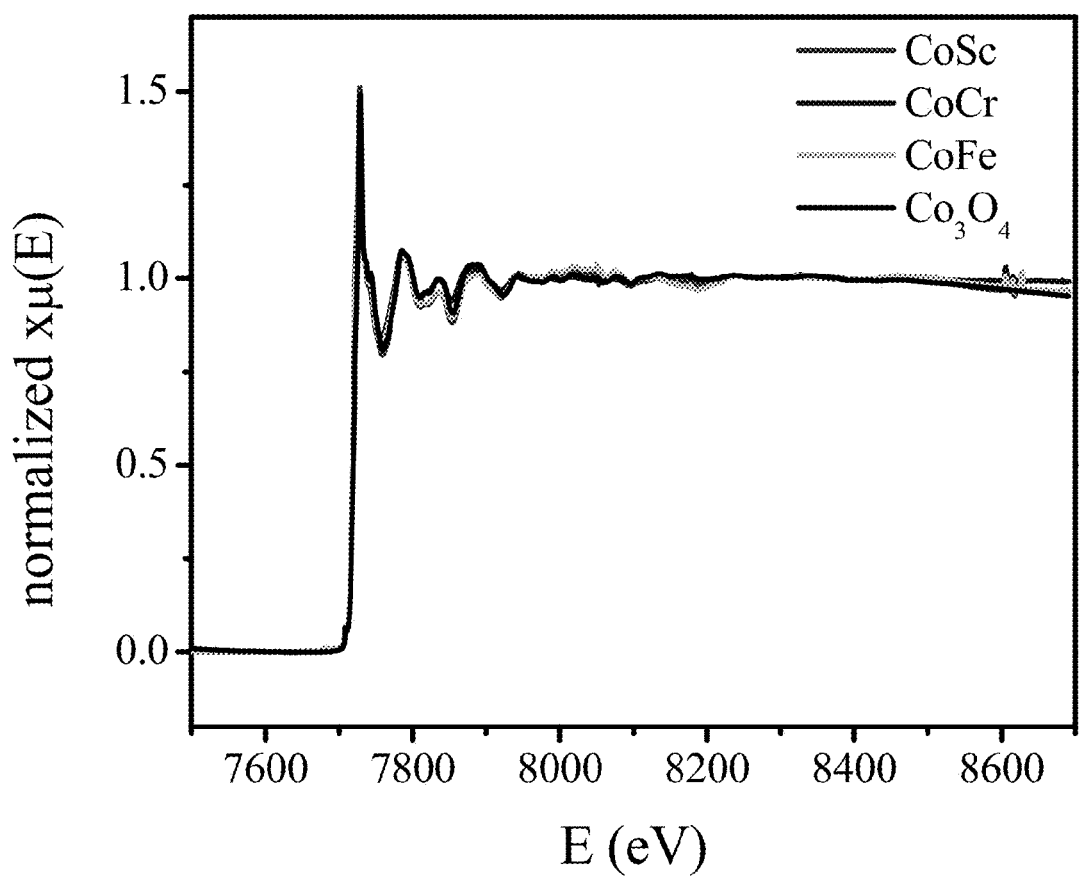
FIG. 8 shows XANE profiles of CoCr, CoFe, CoSc (all with a 9:1 atomic ratio of Co to the second metal) compared to pure $Co_3O_4$ standards.

From EDX, it appears that the nano-particles are composed of solid solutions of Co and Cu. X-ray diffraction (XRD) and (X-ray absorption spectroscopy) XAS, were used to confirm the presence of a solid solution. The XRD pattern shows oxidized CoCu in agreement with the XPS profile. The XRD pattern (shown in FIG. 3c), can be indexed as a distorted spinel cubic phase of $Co_3O_4$ (space group Fd3m, PDF 74-2120). Detailed peak profile comparison shows that the (311) facet peak of CoCu are shifted from that of $Co_3O_4$ toward higher angle (from 36.8° to 36.87°), which is an indication of smaller d-spacing. A decrease in d-spacing is consistent with the inclusion of an atom with a smaller atomic radius (i.e., Cu) to the $Co_3O_4$ phase. Notably, no peaks corresponding to copper species, such as CuO, $Cu_2O$, or Cu, were observed, which suggests near full incorporation of Cu into $Co_3O_4$. Thus, XRD results suggest that the core and shell are both composed of a solid solution structure of Co and Cu. This is consistent with the results from TEM/EDX line scans which indicate intimate physical mixing of Co and Cu throughout the nanoparticle. The formation of a solid solution throughout the nanoparticle is further supported by XAS. Firstly, the X-ray absorption near edge structure (XANES) results presented in FIG. 7 indicates that the crystal structure of CoCu is similar to that of $Co_3O_4$ with no evidence of the presence of secondary phases. Furthermore, the extended X-ray absorption fine structure (EXAFS) reveals an appreciable change in the second shell structure of the CoCu, which can best be attributed to Cu doping, FIG. 3b. In the Radical Structure Function (RSF) of CoCu EXAFS, there are two peaks at the second shell representing tetrahedral coordination (Rordination are two peacoordination (Rordi A) Co. A shift toward lower value as shown in the RSF indicates that a reduction in d-spacing. This is consistent with the XRD results and the prediction from atomic radius. We are, therefore, able to conclude that a solid solution of Co and Cu exists in both the core and the shell of these nanoparticles.

Figure 9A:
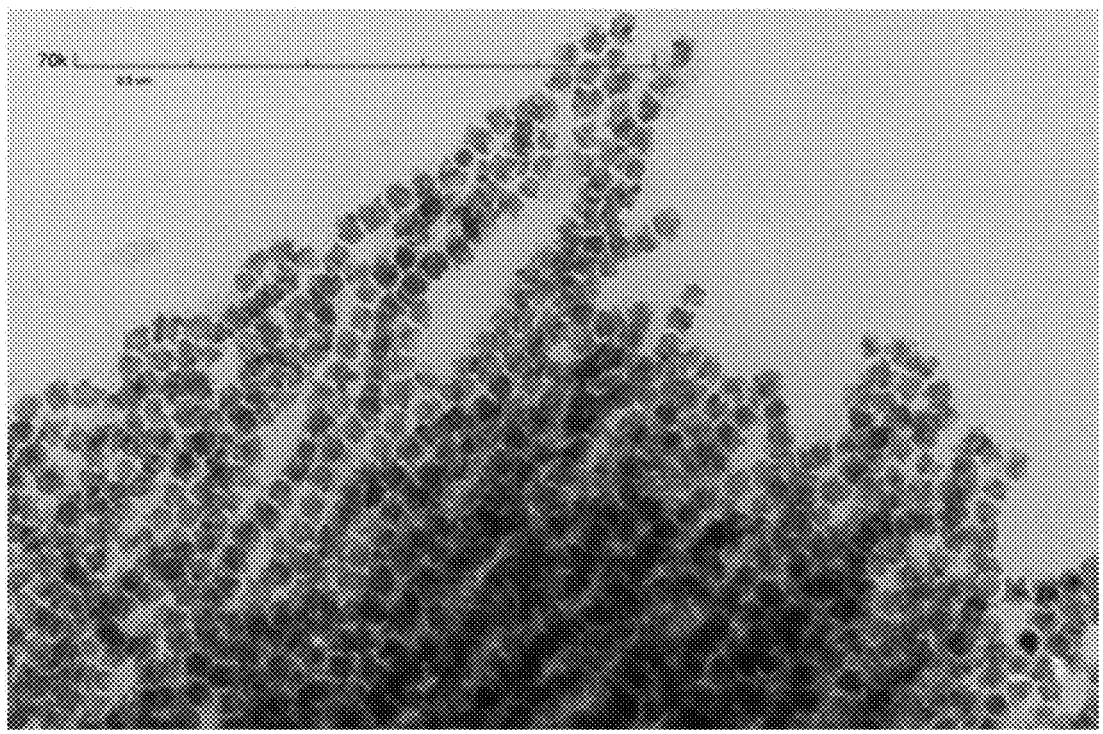
FIG. 9a shows a TEM image of CoFe nanoparticles.
Figure 9B:
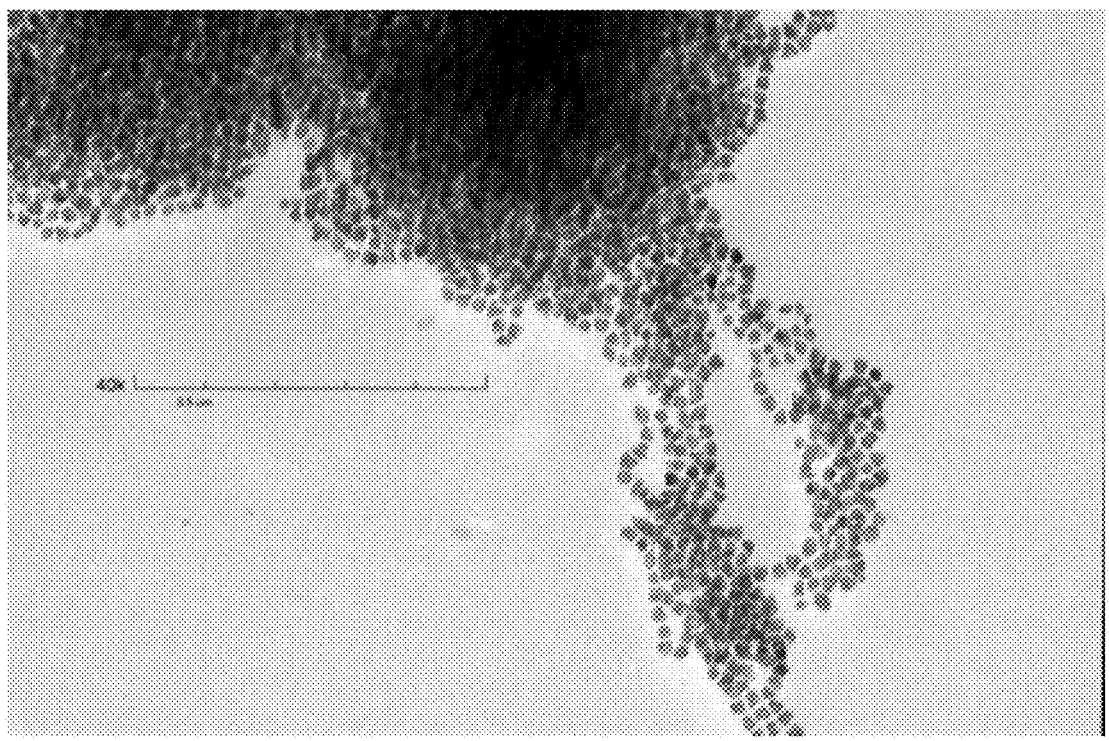
FIG. 9b shows a TEM image of CoCr nanoparticles.
Figure 10A:
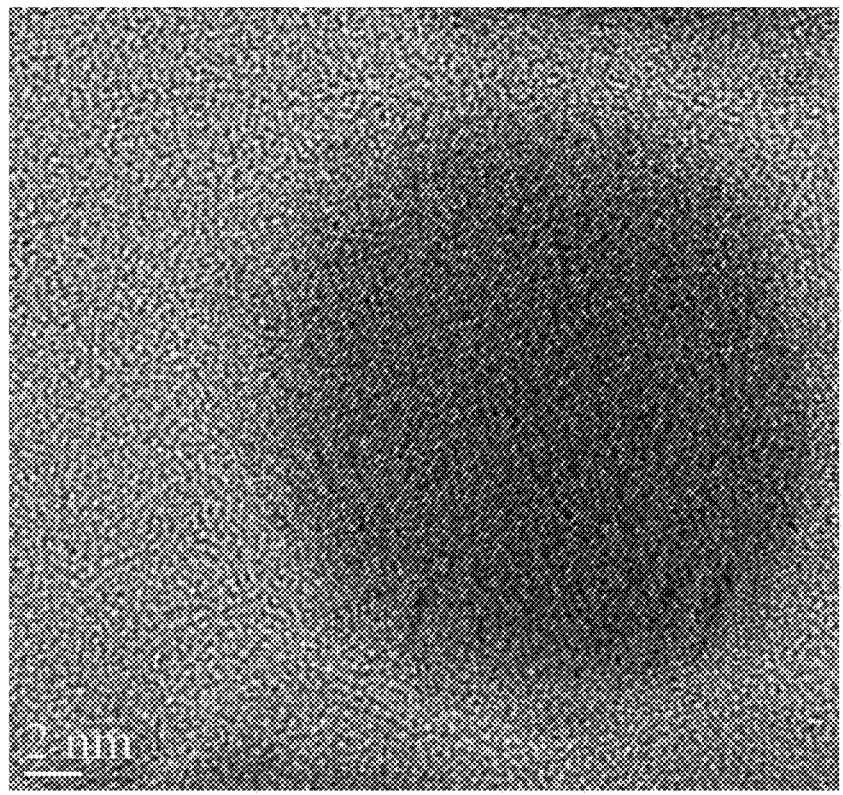
Figure 10B:
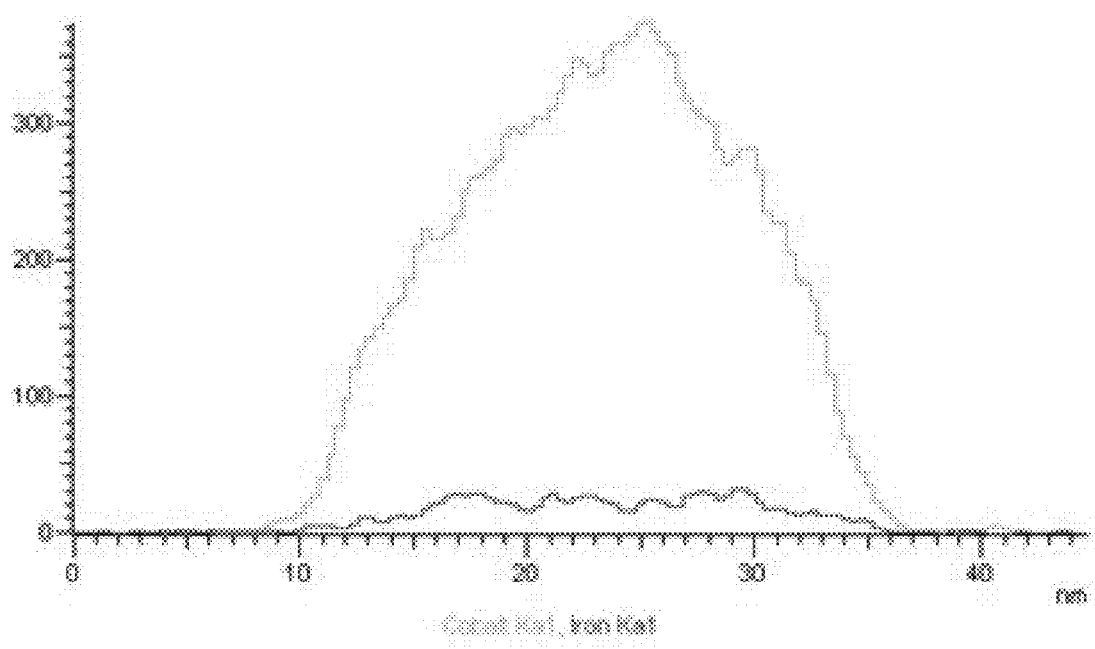

The synthesis strategy was extended from CoCu to other transition metals, such as CoFe and CoCr. As shown in FIG. 9, the bimetallic nanoparticles of CoFe and CoCr have tight size distribution similar to CoCu. The detailed structure of CoFe is characterized by STEM. The CoFe present themselves as single crystal nanoparticles (FIG. 10). The d-pacing is 1.89 nm, corresponding to the (002) face of HCP Co. The EDX lines scan suggests that the CoFe forms alloy structure, which is expected from the similarity of between the reduction potential of Co and Fe precursors. Thus, with this synthesis strategy, mono-dispersed transition bimetallic nanoparticles could be obtained, which has the full potential for scale up production.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming monodispersed core-shell nanoparticles, the method comprising:
adding a cobalt(II)-ligand component, a metal(II)-ligand component, an organic reducing agent, and a capping agent to an organic solvent to form a reaction mixture, wherein the metal(II)-ligand comprises a metal(II) selected from the group consisting of copper(II), iron (II), chromium(II), scandium(II), nickel (II), and mixtures thereof;
heating the reaction mixture to a dissolving temperature while under a gas, wherein the reaction mixture becomes a reaction solution while stirring at the dissolving temperature, and wherein the gas comprises methane;
heating the reaction solution to a reaction temperature while under the gas to form the core-shell nanoparticles, wherein the reaction temperature is about 200° C. or more; and
collecting the core-shell nanoparticles from the reaction solution.

2. The method as in claim 1, further comprising:
after collecting the core-shell nanoparticles, dispersing the core-shell nanoparticles in a solvent.

3. The method as in claim 1, wherein the metal(II)-ligand component comprises a copper(II)-ligand.

4. The method as in claim 3, wherein the copper(II)-ligand comprises copper(II)-acetylacetonate.

5. The method as in claim 3, wherein the core-shell nanoparticles have a core enriched with copper, and wherein the core-shell nanoparticles have a shell enriched with cobalt.

6. The method as in claim 3, wherein the cobalt ligand component comprises cobalt(II)-acetylacetonate.

7. The method as in claim 1, wherein the organic solvent has a boiling point that is higher than the reaction temperature.

8. The method as in claim 1, wherein the organic solvent comprises dibenzyl ether.

9. The method as in claim 1, wherein the dissolving temperature is about 50° C. to about 150° C.

10. The method as in claim 1, wherein the gas is natural gas.

11. The method as in claim 1, wherein the organic reducing agent comprises a long chain alcohol.

12. The method as in claim 11, wherein the long chain alcohol comprises 1,2-dodecanediol.

13. The method as in claim 1, wherein the capping agent comprises a polymer having a repeating, exposed carbonyl group.

14. The method as in claim 1, wherein the capping agent comprises polyvinyl pyrrolidone).

15. The method as in claim 1, wherein the collected core-shell nanoparticles have an average size of about 7 nm to about 50 nm.

16. The method as in claim 1, wherein the collected core-shell nanoparticles have a size distribution such that at least about 75% of the collected core-shell nanoparticles have an average size that is within about 5 nm of the mean average size of all the collected core-shell nanoparticles.

17. The method as in claim 1, wherein the cobalt(II)-ligand component and the metal(II)-ligand component are present in the reaction mixture such that an atomic ratio of cobalt(II) to metal(II) is about 19:1 to about 1:19.

18. The method as in claim 1, wherein the cobalt(II)-ligand component and the metal(II)-ligand component are present in the reaction mixture such that an atomic ratio of cobalt(II) to metal(II) is about 19:1 to about 4:1.

* * * * *